United States Patent [19]

Tuzuki et al.

[11] 4,179,481

[45] Dec. 18, 1979

[54] VINYL CHLORIDE RESIN COMPOSITIONS

[75] Inventors: Minoru Tuzuki; Kuniyoshi Matuba, both of Kobe; Kazuo Saito, Nishinomiya, all of Japan

[73] Assignee: Kanegafuchi Kagaku Kogyo Kabushiki Kaisha, Osaka, Japan

[21] Appl. No.: 849,538

[22] Filed: Nov. 7, 1977

Related U.S. Application Data

[63] Continuation of Ser. No. 641,506, Dec. 17, 1975, abandoned, which is a continuation-in-part of Ser. No. 428,814, Dec. 27, 1973, abandoned, which is a continuation of Ser. No. 235,400, Mar. 16, 1972, abandoned.

[51] Int. Cl.$^2$ ............................................. C08L 53/00
[52] U.S. Cl. .................................... 525/80; 525/343; 525/302; 525/317
[58] Field of Search .................... 260/876 R, 885, 881

[56] References Cited

U.S. PATENT DOCUMENTS

| | | | |
|---|---|---|---|
| 2,992,203 | 7/1961 | Protzmann | 260/885 |
| 3,251,904 | 6/1966 | Souder et al. | 260/876 R |
| 3,655,825 | 4/1972 | Souder et al. | 260/876 R |
| 3,657,172 | 4/1972 | Gallagher et al. | 260/876 R |
| 3,808,180 | 4/1974 | Owens | 260/876 R |
| 3,943,190 | 3/1976 | Abe et al. | 260/876 R |

*Primary Examiner*—J. Ziegler
*Attorney, Agent, or Firm*—Moonray Kojima

[57] ABSTRACT

Vinyl chloride resin composition comprising vinyl chloride series resin and a two stage polymerization product comprising methyl methacrylate or a monomeric mixture containing a major proportion of methyl methyacrylate subjected to emulsion polymerization and then in the presence of the resulting rigid thermoplastic phase an elastomer phase is formed onto the surface of the rigid thermoplastic phase by polymerizing a monomeric mixture containing a major proportion of an acrylic acid ester and/or a methacrylic acid ester, esclusive of methyl methacrylate.

5 Claims, No Drawings

VINYL CHLORIDE RESIN COMPOSITIONS

BACKGROUND OF THE INVENTION

This is a continuation of application Ser. No. 641,506, filed Dec. 17, 1975, now abandoned, which is a continuation in part of Ser. No. 428,814 filed Dec. 27, 1973, which is a continuation of Ser. No. 235,400 filed Mar. 16, 1972, both of which are now abandoned.

This invention relates to vinyl chloride resin compositions having improved workability and physical properties.

Polyvinyl chloride has been widely used due to its excellent physical properties and chemical properties. However, polyvinyl chloride has a significant defect in workability since its working temperature approaches the temperature of thermal decomposition, and a long time is required for obtaining the fused state. Moreover, the workability of the product, for secondary treatment with respect to surface state after extruding molding and with respect to kneaded state of the fused material at calendering working, leaves much to be desired.

Many techniques have been tried to overcome the above defects. Such techniques comprise such methods as adding plasticizers, or copolymerizing vinyl chloride with other monomers, or adding other resins to pvc. Each of these techniques have some deficiency. In short, the prior art pvc's workability cannot be improved sufficiently and still keep excellent physical and chemical properties.

One example of efforts made in the prior art, is the addition of plasticizers and copolymerization of vinyl chloride with other monomers, which causes changes largely of the physical properties. When other resin substances are added to pvc, the melt viscosity of pvc is lowered, and the working temperature is also lowered. Although fluidity of pvc appears to improve by this addition, the gelatinization is insufficient because of consumption of kneading energy with fluidity. Thus, an apparent transparent state of articles is inferior in physical properties to pvc having sufficient gelatinization. Although it is known that a resinous substance can be used to elevate the melt viscosity of pvc, addition of such substance produces some non-gelatinized substances (called "fish eye") which does damage to the appearance of articles.

SUMMARY OF INVENTION AND DETAILED DESCRIPTION OF PREFERRED EMBODIMENTS

An object of this invention is to overcome the aforementioned defects, and to provide a vinyl chloride resin composition having excellent workability and excellent physical properties.

The present invention encompasses a vinyl chloride resin composition having favorable workability and physical properties and comprises 100 parts by weight (referred to hereinafter only as "parts" for sake of convenience) of (A) a vinyl chloride series resin, and incorporated therein 0.1 to 100 parts of (B) a two stage polymerization product obtained by emulsion polymerizing 50 to 99 parts of (I) methyl methacrylate or a monomeric mixture consisting essentially of 85.71 weight percent and above of (a) methyl methacrylate, remainder of (b) acrylic acid ester and/or methacrylic acid ester (exclusive of methyl methacrylate) and (c) other monomers copolymerizable with said monomers (a) and (b) in an amount of less than 20 percent by weight based on the total weight of monomers (a), (b), and (c), and then polymerizing in the presence of the resulting rigid thermoplastic phase, 50 to 1 parts of (II) a monomeric mixture consisting essentially of 40 weight percent or less of (a') methyl methacrylate, remainder (b') acrylic acid ester and/or methacrylic acid ester (exclusive of methyl methacrylate) and (c') other monomers copolymerizable with monomers (a'), and (b') in an amount of less than 20 weight percent based on the total weight of monomers (a'), (b') and (c') thereby to polymerize an elastomer onto the surface of said rigid thermoplastic phase and thereby form composite interpolymer (B). The blend of component (B) and (A) has excellent workability and other physical properties as set forth herein.

Products prepared by comparative prior art methods, i.e. other than the above inventive method, are deficient in workability, transparency and other physical properties. For examples, one prior art method (a) employes an ordinary polymerization method in which all the monomers constituting components of (B) are copolymerized at random (random copolymers). Another method (b), such as taught in U.S. Pat. No. 3,808,180 employs an elastomer phase, such as the above component (II), as a core and polymerizes on the surface thereof rigid thermoplastic phase, such as the above component (I) (contrary two stage polymerization product). The prior art method (b) is opposite of the present invention, wherein a rigid thermoplastic phase is used as the core and an elastomer phase is polymerized thereon. Surprisingly, the resulting composite interpolymers from the Owens U.S. Pat. No. 3,808,180 and from the present invention have substantially different properties, the present invention having substantially better workability and other physical properties. Also, another prior art method (c) copolymerizes the monomers comprising component (I) and monomers comprising component (II) separately, then coagulating the resulting copolymer's lattices, and then blending in the powdery state (powdery mixtures). All of these prior art methods produce products which are defective in workability and transparency.

The components of the illustrative compositions of this invention will be explained in further detail hereinbelow.

Component A, namely described herein as vinyl chloride series resin includes polyvinyl chloride, copolymers of above 80 parts by weight of vinyl chloride with one or more monomers copolymerizable therewith, or after chlorinated polyvinyl chloride. These may be used singly or in mixture of two or more.

Although it is not clearly understood how the fine structure of composite interpolymer (B) influences the resulting vinyl chloride resin composition or blend, it seems that when fine particles of soft copolymer (II) (also known in the art as an elastomer) comprising 60 weight percent or more of an acrylic acide ester and the like and having a low softening temperature, are attached around fine particles of polymethyl methacrylate or copolymer (I) (also known in the art as a rigid thermoplastic polymer) containing 85.71 weight percent and above methyl methacrylate and having a high softening temperature, and these composite interpolymer particles in such state are mixed or blended with a vinyl chloride resin, gelation is accelerated and an effect of complete gelation is attained. Such phenomena are apparent from experimental results shown in Tables 1 and 2.

Examples of acrylic acid esters and/or methacrylic acid esters exclusive of methyl methacrylate, which are starting materials for components (I) and (II) of the two stage polymerization product are methyl acrylate, ethyl acrylate, n-butyl acrylate, isobutyl acrylate, 2-ethylhexyl acrylate, chloroethyl acrylate, ethyl methacrylate, n-buty methacrylate, isobutyl methacrylate, 2-ethylhexyl methacrylate, and chloroethyl methacrylate. These compounds may be used singly or in the form of admixtures of two or more. Especially preferred is methyl acrylate, ethyl acrylate, n-butyl acrylate, ethyl methacrylate and n-buty methacrylate.

Parts of methyl methacrylate (a) and (a') and acrylic acid esters and/or methacrylic acid esters exclusive of methyl methacrylate (b) and (b') to be used for the elastomer and rigid thermoplastic phases, may be replaced by other monomers (c) and (c') copolymerizable therewith without changing the ratios of the monomers (a) and (b) and (a') and (b'). Minor proportions of various other monomers maybe used as discussed. In order to not reduce the advantageous aspects of the compositions of the invention, it is preferred that the amount of such other monomer be less than 20 weight percent based on the total weights of the monomers of components (I) and (II). As such other monoolefinic monomer, the following may be used: unsaturated nitriles (such as acrylonitrile and methacrylonitrile) and vinyl esters (such as vinyl acetate and vinyl propionate). These monomers may be used singly or in admixture of two or more. Since monomer (c) and (c') has an independent position in the composition, either one, both or none may be used.

Better results are obtained when the composite interpolymer (B) has a degree of polymerization exceeding a certain level when it is incorporated into a vinyl chloride resin. Although a preferred degree of polymerization of component (B) varies, generally, depending upon the composition and the degree of polymerization of the vinyl chloride resin, it is advantageous to use component (B) having a specific viscosity, of at least 0.1, and preferably at least 0.5, as measured at 30° C. in a benzene solution of the polymer concentration of 0.4 g/100 cc.

The glass transition temperature of the rigid thermoplastic phase (Component (I)) is preferably higher than 25° C., and the glass transistion temperature of the elastomer phase (Component (II)) is preferably less than 25° C. The above state proportions of 85.71 weight percent and above methyl methacrylate and remainder acrylic or methacrylic acid ester for the rigid thermoplastic phase has produced rigid thermoplastic phase polymers having glass transition temperature of about 25° C. The above state proportion of 40 weight percent or less methyl methacrylate, remainder acrylic or methacrylic acid ester for the elastomer phase produces elastomers having glass transition temperature of less than 25° C. It should be noted that in the specification all parts and percents are in terms of weight unless otherwise noted.

The glass transition temperature of two or more monomers may be calculated in accordance with the formula:

$$\frac{1}{Tg} = \frac{W(1)}{Tg(1)} + \frac{W(2)}{Tg(2)} \quad (1)$$

wherein,

W(1)=weight percent of monomer (1)
W(2)=weight percent of monomer (2)
Tg(1)=Tg°K. (°C.+273) of monomer (1)
Tg(2)=Tg°K. (°C.+273) of monomer (2)
Tg=Tg° K. (°C.+273) of copolymer copolymerized from monomer (1) and (2).

The glass transition temperature of various monomers, such as those used herein, may be obtained from any reputable handbook, such as for example, Polymer Handbook (1962) published by Interscience Publishers, London, pages III-66 etseq.

When the glass transition temperature outside of the above ranges are used, the properties desired will not be optimally produced. For example, when such as above discussed in Owen Patent an elastomer is used, having a glass transition temperature below 20° C., more preferably 10° C., and most preferably −25° C., as the core on which a rigid thermoplastic phase is polymerized, the desired workability properties and other physical properties are not produced.

It is known to knead polymethyl methacrylate with a vinyl chloride resin. However, since the softening temperature of the rigid thermoplastic phase polymethyl methacrylate is too high, sufficient dispersion thereof in the vinyl chloride resin cannot be attained under ordinary processing conditions and great portion will remain ungelled. If the dispersion of the rigid thermoplastic phase polymethyl methacrylate is effected under severe processing conditions to accomplish the gelation, the resulting vinyl chloride resin is not applicable to practical use because of thermal degradation. In case polymethyl methacrylate, whose thermal fluidity is increased by reduction of degree of polymerization, is kneaded with a vinyl chloride resin, although there remains no ungelled portion, any effect of improving workability of the vinyl chloride resin is not at all attained. Thus, gelation-accelerating property, surface states and secondary processibility of the product are not improved.

It is also known to knead a random copolymer of methyl methacrylate and an acrylic acid ester with a vinyl chloride resin. Although it is considered that the goal of such method resides in attaining complete gelation in the composition by employing a copolymer having a softening temperature lower than that of polymethyl methacrylate, if the amount of the acrylic acid which is copolymerized is small, ungelled portions remain in the kneaded product with the vinyl chloride resin. On the other hand, if the amount of the acrylic acid is large, the transparency of the vinyl chloride resin is reduced. Thus, it is impossible to solve both problems together.

In case only the component (I) of polymer (B) in the composition is used and kneaded with vinyl chloride resin, the resulting composition is defective with respect to occurrence of ungelled portions. However in case the composite interpolymer (B) comprising component (I) and (II) is kneaded with vinyl chloride resin, the above defect is overcome and there is obtained a composition characterized by a very short time for gelation without the occurence of any ungelled portions and having good transparency.

Furthermore, the inventive composition retains excellent physical and chemical properties inherent in vinyl chloride resins. Stiff further, addition of the composite interpolymer (B) give a smooth and lustrous surface to the product, and the product exhibits various advantages occuring during secondary processing. For example, it can be easily drawn deep at the time of vacuum molding.

In case only component (II) i.e. the elastomer phase, is incorporated into a vinyl chloride resin, occurence of ungelled portions can be prevented, but the resulting composition is semitransparent or opaque. Furthermore, the composition is inferior in acceleration of gelation.

It is advantageous to use the composite interpolymer (B) in an amount of from 0.1 to 100 parts per 100 parts of the vinyl chloride series resin (A). When component (B) is incorporated in an amount exceeding 100 parts, the resulting composition is inferior in flame resistance and chemical resistance. When component (B) content is less than 0.1 part, substantial improvement in workability is not attained.

The use of a composite interpolymer (B) in which the amount of component (II) is larger than the amount of component (I) is not preferred, because the resulting vinyl chloride resin composition is inferior in transparency.

Component (I) i.e. the rigid thermoplastic phase, consists essentially of methyl methacrylate or monomeric mixture of 85.71 weight percent and above methyl methacrylate, and remainder acrylic and/or methacrylic acid ester, exclusive of methyl methacrylate, and other monoolefinic monomers copolymerizable with the foregoing. This component (I) forms the core of the resulting composite interpolymer and must have a large proportion of methyl methacrylate, with 85.71 being preferred in a monomeric mixture to obtain suitable balance of physical properties.

Component (II) i.e. the elastomer phase, consists essentially of 40 weight percent less methyl methacrylate (a') and remainder of a monomer (b') selected from acrylic and/or methacrylic acid ester, exclusive of methyl methacrylate, and (c') other monoolefinic monomers copolymerizable therewith in an amount less than 20 weight percent based on the total weight of monomers (a'), (b'), and (c'). For obtaining a vinyl chloride blend which is free of ungelled portions and being well accelerated for geleation with a suitable degree of gelation, it is necessary for the elastic phase (II) to have good compatibility with the vinyl chloride series resin (A) and component (I), namely the rigid thermoplastic phase of the composite interpolymer (B) and have a considerably lower softening temperature than those of both components (A) and (B).

For keeping a lower softening temperature in component (II), it is essential that the amount of methyl methacrylate (a') be smaller than the amount of monomer (b') or (b') and (c'), and preferably being 40 weight percent or less. If the amount of methyl methacrylate in component (II) is larger than the amount of monomer (b'), there is formed a random rigid copolymer, as contrasted with an elastomer, similar to the product obtained by the aforementioned comparative prior art method, and the resulting blend comprises ungelled portions.

The incorporation of the two stage composite interpolymer polymerization product into vinyl chloride series resin (A) may be accomplished by customary methods, and the way of incorporation is not critical.

In the emulsion polymerization effected for obtaining components (I) and (II) of the two stage polymerization product any of various known emulsifiers may be used, and water soluble, oil soluble and redox types of polymerization initiators may be used. The degree of polymerization is optionally adjusted by choosing a suitable combination of polymerization temperature and chain transfer agent according to customary techniques.

The resulting vinyl chloride resin composition may be used for molding with or without the use of stabilizers, lubricants, impact resistance enforcing agents, plasticizers, coloring agents, fillers, blowing agents, and other additives.

Embodiments and various advantages, features and effects and operations of the invention will now be illustrated with the folowing examples.

EXAMPLE 1

Into a reactor equipped with a stirrer, there is charged an aqueous solution of sodium dodecylbenzenesulfonate (2 parts) and ammonium persulfate (0.1 part). Water was added thereto until the total amount of water was removed. The solution was stirred at 60° C. Methyl methacrylate (80 parts) was added thereto in 4 hours. After addition of the monomer, the resultant mixture was stirred, with heating, for an hour, whereby the polymerization was substantially completed. A mixture of ethyl acrylate (13 parts) and methyl methacrylate (7 parts) was added thereto in an hour. The mixture was kept at 60° C. for 1.5 hours and cooled. The conversion of polymerization was 99.5%. The latex was slated out with sodium chloride, filtered, washed with water, and dried to produce 98 parts of polymer sample (1). The specific viscosity of polymer sample (1) was 1.60 as measured in benzen solution (0.4 g/100 ml) at 30° C.

Similar procedures were used to produce polymer samples (2), (3) and (4), which were used as contrast samples. Polymer sample (2) was prepared by polymerization of only methyl methacrylate corresponding to the aforementioned polymer (I). The polymer sample (3) was prepared by polymerizing a mixture of ethyl acrylate (13 parts) and methyl methacrylate (7 parts) corresponding to the aforementioned polymer (II). Polymer sample (4) was a random copolymer obtained by polymerizing a mixture of monomers constituting polymer sample (1).

Each polymer sample (5 parts) was admixed with polyvinyl chloride (average polymerization degree of 660) (100 parts), tin actyl mercaptide stabilizer (1.5 parts), soya bean oil epoxide (1.5 parts), butyl stearate (1.0 part) and aliphatic acid polyglycol ester (0.5 part), and the resulting mixture was subjected to the following tests. Results are shown in Table 1.

The workability is measured by working a sample (55.0 g.) at 160° C. (of mixer temperature) with a Brabender plastograph tester.

The period of gelatinization represents the maximum time (in minutes) of blending resistance afer start of working. When the period is shorter, working is easier and gelatinization is more rapid and accelerated. The amount of non-gelatinized substance (called "fish eye") is measured by blending the composition for 10 minutes after attaining the maximum blending resistance, taking up a sample worked, elongating it in a thickness of below 0.3 mm with a roll and observing the elongated sheet with the naked eyes.

Notes to Table 1. Note 1. Cloud value cannot be measured due to a large amount of non-gelatinized substances on the transparent plate. Note 2. Cloud value cannot be measured due to white tubidity on the transparent plate.

TABLE 1

| | Preparation of Polymer (B) Polymer sample No. | | | Example of Invention Monomers (I) polymerized in emulsion and Monomers (II) added to polymerize therewith in same phase (1) | Contrast Examples | | | |
|---|---|---|---|---|---|---|---|---|
| | | | | | 1 Only polymer (I) (2) | 2 Only polymer (II) (3) | 3 Monomer constituting polymers (I) and (II) mixed and polymerized to give random copolymer (4) | 4 Free of polymer(B) |
| Subcomponent of Component (B) | Amount of Monomers constituting polymer (B) (I + II) | Amount of monomer constituting polymer (I) | Methyl Methacrylate | 80 | 100 | 0 | 0 | 0 |
| | | Amount of monomer constituting polymer (II) | (b') ethyl acrylate | 13 | 0 | 65 | (13) | 0 |
| | | | (a') methyl acrylate | 7 | 0 | 35 | (87) | 0 |
| | Percent (%) of (a) in Polymer (II) | | | 65 | — | 65 | — | |
| | RAtion (I)/(II) of Polymer (B) | | | 80/20 | 100/0 | 0/100 | — | |
| Properties of the End Composition | Workability | Non-gelatinized substance | | none | very much found | none | rather much found | none |
| | | period for gelation (minutes) | | 0.3 | 1.5 | 1.0 | 1.0 | 4.0 |
| | Transparency | Degree of gelation | | 1 | 2 | 2 | 2 | 4 |
| | | Percent transmission of total rays (%) | | 77.9 | 69.8 | 3.0 | 77.0 | 73.0 |
| | | Cloud value (%) | | 3.5 | Note (1) | Note(2) | 3.5 | 4.5 |
| | | Percent transmission of single wave length T400 (%) | | 51.5 | 2.5 | 0 | 48.0 | 43.5 |
| | | T600 (%) | | 75.5 | 55.0 | 0 | 73.0 | 68.0 |

The degree of gelatinization is measured by observing the sense of transparency, with the naked eyes. When gelatinization is not well achieved, the inside of the vinyl chloride resin composition has many hollow spaces which fail to give a sense of sufficient transparency. A smaller number of hollow spaces shows a more advanced degree of gelatinization.

The transparency is measured by blending the composition at 150° C. for 5 minutes with a roll, pressing it at 160° C. for 15 minutes to prepare a plate of 3 mm thickness and then observing the transparency on the plate. The percent transmission of total rays and the cloud values are measured according to Japanese Industrial Standard (JIS) K-6714. A larger percentage of transmission of total rays shows better transparency and a smaller percentage of cloud value shows better transparency. The percentage transmission of single wave length is measured by a spectrophotometer on a standard percentage transmission of visible rays at 400 mµ and 600 mµ, the standard being known as T400 and T600.

In particular, a mixture of methacrylic acid ester resin and vinyl chloride resin affords often bluish turbidity, and the degree of turbidity can be decided by T400. The value of T600 means transparency, showing almost the same inclination as the percent transmission of total rays. A larger value of T400 and T600 represents better transparency (composition, preparation of test pieces and methods of measurement are similarly effected hereinafter on "transparency").

Thus, it is evident from the above test results shown in Table 1, that polymer sample (1) of this invention has better workability and transparency than the contrast polymer samples (2) and (3). Polymer sample (1) is excellent in all the properties of workability, including in particular, the resolution of the problem of non-gelatinized substances, and has substantially improved transparency, in comparison to contrast polymer sample (4) of the random copolymer having the same composition of monomers as that of the present invention. In comparison with the composition being free of polymer materials, the present polymer sample (1) is excellent in workability. Thus, the composition of polyvinyl chloride containing polymer sample (1) of this invention shows a short period for gelatinization and favorable workability without non-gelatinized substances. The present composition is excellent in transparency, showing low cloud value and little turbidity in T400.

EXAMPLE 2

The following samples, prepared by mixing vinyl chloride resin with polymer (B) are subjected to the same tests as in Example 1, in order the examine what differences are produced by different methods of preparing polymers (B). The components are shown in Table 2. Data obtained in Example 1 is referred to polymer sample (I). This sample is considered to have partially graft or block structure. The latex (2) and latex (3) of polymer sample (J) (each average granular diameter: almost 1000 Å) are blended in a ratio of 8:2 in order to make the same composition as polymer sample (1). The resultant blend is coprecipitated with sodium chloride, washed with water and dried to give a test sample.

Control sample (K) is prepared by coagulating each latex of polymer samples (2) and (2), drying to make powder having almost the same granular distribution as polyvinyl chloride respectively, and blending the two powders in a ratio of 8:2 in order to make the same composition as polymer sample (1).

Control sample (L) is prepared by using the same total monomers as those of polymer sample (1) and polymerizing (I) and (II) in the contrary order. Accordingly, a mixture of ethyl acetate (13 parts) and methyl methacrylate (7 parts) (corresponding to polymer (II)) is added in a one hour period to the polymerization atmosphere described in Example 1. The resultant mixture is stirred, with heating, for one hour to substantially complete the polymerization. Methyl methacrylate (80 parts) (corresponding to polymer (I) is added thereto in a 4 hour period. The resultant mixture is kept at 60° C. for 1.5 hours, salted out to coagulate and dried to give control sample (L).

The above 4 samples are arranged to have almost the same granular distribution as that of polyvinyl chloride used in view of the influence of granular size over the remaining non-gelatinized substance.

Results are shown in below Table 2.

It is evident from the results shown in below Table 2, that the composition of the present invention can produce products free of non-gelatinized substances, being gelatinized in a short time and having good degree of gelatinization according to the method for preparing polymer (B). The most favorable is polymer sample (I), and next most suitable is polymer sample (J).

EXAMPLE 3

Polymer samples (5) to (12) were obtained by effecting the same procedures as in Example 1, and using the amounts of each monomer of (I) and (II) in polymer (B) as shown in Table 3, hereinbelow, and changing the ratio of acrylic acid ester or methacrylic acid ester (excluding methyl methacrylate) (a) and methyl methacrylate (b) in aforementioned component (II). Tests were executed as in Example 1. Results thereof are shown in Table 3, hereinbelow. Results of polymer sample (1) obtained in Example 1 are referred to therein.

Control polymer samples (9) and (10) leave non-gelatinized substances and take a long period for gelatinization due to an insufficient amount of component (a) in polymer (II). Control polymer samples (10) and (11) lack transparency and are apt to leave non-gelatinized substances due to the presence of only component (a) and the absence of methyl methacrylate (b) in polymer (II). Polymer sample (8) using other monomers in polymer (II) and within the scope of compositions of this invention exhibits equivalent results. It is evident that each of polymer samples of this invention are excellent in workability and transparency.

Note to Table 2. Note 1. Cloud value cannot be measured due to a large amount of non-gelatinized substances on transparent plate.

TABLE 2

| | | | | Examples of the invention | | Contrast Examples | |
|---|---|---|---|---|---|---|---|
| | | Sample mark | | (I) | (J) | (K) | (L) |
| | | Preparation of Polymer (B) | | Monomer (I) polymerized in emulsion, and monomers, (II) added to polymerize therewith in same phase | (I) and (II) polymerized in emulsion respectively and blended in latex | (I) and (II) polymerized in emulsion respectively treated respectively and blended in powder | Monomers (II) polymerized in emulsion and monomer (I) added to polymerize therewith |
| Subcomponents of Component (B) | Amount of monomers constituting polymer (B) (I + II) | Amount of monomers constituting polymer (I) | Methyl methacrylate | 80 | 80 | 80 | 80 |
| | | Amount of monomers constituting polymer (II) | (b')Ethyl acrylate | 13 | 13 | 13 | 13 |
| | | | (a')Methyl acrylate | 7 | 7 | 7 | 7 |
| | Percent of (a) in polymer (II) | | | 65 | 65 | 65 | 65 |
| | Ratio of (I)/(II) in polymer (B) | | | 80/20 | 80/20 | 80/20 | 80/20 |
| Properties of the End Composition | Workability | non-gelatinized substance | | None | None | Rather much found | Rather much found |
| | | Time of gelation (minutes) | | 0.3 | 0.4 | 1.5 | 1.3 |
| | | Degree of gelation | | 1 | 1 | 2 | 2 |
| | Transparency | Percent transmission of total rays (%) | | 77.9 | 77.0 | 71.0 | 75.3 |
| | | Cloud value (%) | | 3.5 | 3.8 | Note (1) | 4.5 |
| | | Percent transmission of single wave length | | | | | |
| | | T400(%) | | 51.5 | 50.7 | 5.3 | 47.0 |
| | | T600(%) | | 75.5 | 74.3 | 57.3 | 72.0 |

TABLE 3

| | | | | Examples of the invention | | | | | Contrast Examples | | | |
|---|---|---|---|---|---|---|---|---|---|---|---|---|
| | | Polymer Sample Number | | (1) | (5) | (6) | (7) | (8) | (9) | (10) | (11) | (12) |
| Subcomponent of component (B) | Amount of monomers constituting polymer (B) (I + II) | Amount of monomer constituting polymer (I) | Methyl methacrylate | 80 | 80 | 80 | 70 | 80 | 70 | 80 | 80 | 80 |
| | | Amount of monomers constituting polymer (II) | (b')Ethyl acrylate | 13 | 10 | 10 | 13 | | 10 | 10 | 10 | 5 |
| | | | (b')n-butyl | | 13 | 5 | 10 | | | | | 10 |

TABLE 3-continued

|  |  |  | | Examples of the invention | | | | | Contrast Examples | | | |
|---|---|---|---|---|---|---|---|---|---|---|---|---|
| | Polymer Sample Number | | | (1) | (5) | (6) | (7) | (8) | (9) | (10) | (11) | (12) |
| | | | methacrylate | | | | | | | | | |
| | | | (c)Acrylo-nitrile | | | | | 2 | | | | |
| | | | (a')Methyl methacrylate | 7 | 7 | 5 | 10 | 5 | 20 | | | 15 |
| | Percent(%) of (a) in polymer (II) | | | 65 | 65 | 75 | 67 | 65 | 33 | 0 | 0 | 25 |
| | Ration (I)/(II) in polymer (B) | | | 80/20 | 80/20 | 80/20 | 70/30 | 80/20 | 70/30 | 90/10 | 80/20 | 80/20 |
| Properties | Workability | Non-gelatinized substance | | None | None | None | None | None | Found | Scarcely found | found | rather much found |
| of the End Composition | | Time for gelation (minutes) | | 0.3 | 0.4 | 0.5 | 0.4 | 0.4 | 0.7 | 1.0 | 4.0 | 1.3 |
| | | Degree of gelation | | 1 | 1 | 1 | 1 | 1 | 1 | 2 | 2 | 2 |
| | Transparency | Percent transmission of total rays (%) | | 77.9 | 78.0 | 77.0 | 77.3 | 77.0 | 75.2 | 70.0 | 71.3 | 73.0 |
| | | Cloud value (%) | | 3.5 | 3.5 | 3.6 | 3.0 | 3.4 | 3.5 | 9.1 | 4.5 | 4.5 |
| | | Percent transmission of single wave | | | | | | | | | | |
| | | T400 (%) | | 51.5 | 50.0 | 51.0 | 51.0 | 51.5 | 46.5 | 44.0 | 45.0 | 46.0 |
| | | T600 (%) | | 75.5 | 75.5 | 76.7 | 76.0 | 75.0 | 74.0 | 48.5 | 70.5 | 73.0 |

EXAMPLE 4

Polymer samples (13) to (19) were obtained by repeating the same procedures as in Example 1, using each amount of monomers of components (I) and (II) in polymer (B) as shown in Table 4, and changing the ratio of components (I) and (II) in polymer (B). The tests are carried out similarly to Example 1. Table 4, hereinbelow, shows the results thereof. Results of polymer samples (1) and (2) in Example 1 are referred to therein.

From the results shown in Table 4, it can be seen that the amount of (I) being 50 to 99 parts and the amount of (II) being 50 to 1 part in polymers (B) produces improved and favorable transparency.

EXAMPLE 5

Polymer sample (1) was prepared as in Example 1, and the following tests were carried out. Control sample free of polymer sample (1) was used. 1. Polyvinyl chloride (average polymerization degree of 1040) (100 parts), tin mercaptide stabilizer (3 parts), butyl stearate (1 part) and polymer sample (1) (10 parts) were admixed. The resultant mixture was blended at 140° C. with a roll to coil easily around the roll, whereby a transparent sheet was obtained. This sheet was bent but not divided.

The control composition containing no polymer sample (1) required a certain time for coiling around the roll at 140° C., and the sheet obtained thereby was bent to be divided due to lack of gelatinization. For obtaining such a sheet having sufficient strength, the composition is required to be rolled at 155° C.

When polyvinyl chloride (average polymerization degree of 2500) was used, there was observed a difference in rolling temperature (about 15° C.) for obtaining a sheet having sufficient strength.

TABLE 4

| | | | | | Examples of The Invention | | | | | Contrast Examples | | | |
|---|---|---|---|---|---|---|---|---|---|---|---|---|---|
| | | Polymer sample Number | | | (13) | (1) | (14) | (15) | (16) | (2) | (17) | (18) | (19) |
| Subcomponents of component (B) | Amount of monomers constituting polymer (B) (I+II) | Amount of monomer constituting polymer (I) | Methyl methacrylate | | 95 | 80 | 90 | 80 | 60 | 100 | 40 | 40 | 20 |
| | | Amount of monomers constituting polymer (II) | (b') Ethyl acrylate | | 4 | 13 | 4 | 7 | | | 40 | 24 | |
| | | | (b') n-Butyl methacrylate | | | | | 3 | 6 | | | | |
| | | | (b') Ethyl methacrylate | | | | | | 15 | | | | 30 |
| | | | (b') n-Butyl acrylate | | | | | | 15 | | | | 30 |
| | | | (a') Methyl methacrylate | | 1 | 7 | 3 | 7 | 10 | | 20 | 18 | 20 |
| | Percent (%) of (a) in polymer (II) | | | | 75 | 65 | 70 | 65 | 75 | | 67 | 70 | 75 |
| | Ratio (I)/(II) in polymer (B) | | | | 95/5 | 80/20 | 90/10 | 80/20 | 60/40 | 100/0 | 40/60 | 40/60 | 20/40 |
| Properties of end composition | Workability | Non-gelatinized substance | | | scarcely found | none | None | None | None | very much found | None | None | None |
| | | Time for gelation (minutes) | | | 1.1 | 0.3 | 0.7 | 0.5 | 0.8 | 1.5 | 1.0 | 1.5 | 1.0 |
| | Transparency | Degree of gelation | | | 1 | 1 | 1 | 1 | 1 | 2 | 1 | 2 | 3 |
| | | Percent transmission of total rays (%) | | | 78.9 | 77.9 | 78.7 | 78.5 | 72.3 | 69.8 | 41.7 | 50.5 | 4.0 |
| | | Cloud value (%) | | | 4.0 | 3.5 | 2.9 | 3.0 | 4.0 | note | 16.7 | 5.8 | note |

TABLE 4-continued

|  | Examples of The Invention | | | | | Contrast Examples | | | |
|---|---|---|---|---|---|---|---|---|---|
| Polymer sample Number | (13) | (1) | (14) | (15) | (16) | (2) | (17) | (18) | (19) |
|  |  |  |  |  |  | (1) |  |  | (2) |
| Percent transmission of single wavelength |  |  |  |  |  |  |  |  |  |
| T400(%) | 51.0 | 51.5 | 52.5 | 52.0 | 49.7 | 2.5 | 6.5 | 21.3 | 0 |
| T600(%) | 74.5 | 75.5 | 77.5 | 77.5 | 70.0 | 55.0 | 38.0 | 48.0 | 0 |

Note to Table 4. Note (1). Cloud value cannot be measured due to large amount of non-gelatinized substance on the transparent plate. Note (2). Cloud value cannot be measured due to white turbidity on transparent plate.

2. The composition of (1) was used except polyvinyl chloride had an average polymerization degree of 760. 10 parts of polymer sample (1) was used. The resultant mixture was blended at 155° C. with a roll for 5 minutes to produce a sheet of 0.5 mm thickness. This sheet was heated at 160° C. and subjected to vacuum molding, wherein deep draw was available.

A control composition containing no polymer sample (1) was broken at the vacuum molding, whereby it could not be molded. This sheet was pressed at 165° C., and the Dambel test chip JIS 2, obtained by cutting work was subjected to the elongation test for breaking elongation at 140° C. in a tensile rate of 100 mm/minute. The composition containing polymer sample (1) showed a 200% elongation. The composition free of polymer sample (1) showed a 65% elongation.

3. Polymer sample (1) (2 parts) was added to a mixture of polyvinyl chloride (average polymerization degree of 600) (87 parts), impact resistance enforcing agent (copolymer resin of methyl methacrylate-butadiene-styrene: KANE ACE B-12 prepared by Kanegafuchi Chemical Industry Co, Ltd) (13 parts), tin octyl mercaptide stabilizer (1.5 parts), soybean oil epoxide (1.5 parts), butyl stearate (1.0 part) and aliphatic acid polyglycol ester (0.5 parts). The resultant mixture is subjected to blow molding.

The composition containing polymer samples (1) (2 parts) produced bright blow bottles having uniform appearance 5 hours after the start of blow molding and being free of non-gelatinized substance.

The composition containing no polymer sample (1) produced bottles lacking brightness on the surface, 1 hour after the start of blow molding. This fact showed that the composition of this invention containing polymer sample (1) can uniformly produce the improved bottles for a long time.

4. Polymer sample (1) (5 parts) was added to a mixutre of vinyl chloride copolymer resin (average polymerization degree of 800) (100 parts) containing 80% vinyl chloride, tin mercaptide stabilizer (3 parts) and butyl stearate (1 part). The resultant mixture was subjected to Brabender plastograph tester to measure workability, wherein 0.1 minute was required for gelatinization. The blend was free of non-gelatinized substance and was well gelatinized. The composition containing no polymer sample (1) took 1 minute for gelatinization. The blend was substantially non-gelatinized.

5. Polymer sample (1) (3 parts) was added to a mixture of after-chlorinated polyvinyl chloride (average polymerization degree of 800) (100 parts) containing 66% chlorine, tin stabilizer (3 parts) and metal soap (3 parts). The resultant mixture was subjected to an extruder (L/D 22; C.R. 3.5) of 65 mm$\phi$ to extrude hollow pipes, whereby there was obtained pipes havingfavorable appearance on the surface and being well gelatinized. The composition without polymer sample (1) produced pipes lacking in brightness on the surface and having many rough parts. It was evident that the composition of this invention containing post chlorinated polyvinyl chloride can be easily gelatinized

EXAMPLE 6

A reactor equipped with a stirrer was charged with an aqueous solution of 2 parts of sodium dodecylbenzenesulfonate and 0.1 part of ammonium persulfate. Water was added thereto until the total amount of water was 200 parts. Oxygen contained in the inside atmosphere of the reactor and in the charge was removed. The temperature of the solution was elevated to 60° C. under agitation, and a monomeric mixture consisting of 75 parts of methyl methacrylate and 10 parts of n-butyl methacrylate (corresponding to component (I) of polymer (B)) was added thereto over a period of 4 hours and 15 minutes. After completion of the addition of the monomeric mixutre, heating under agitation was continued for 1 hour to substantially complete the polymerization. Then, a monomeric mixture consisting of 5 parts of methyl methacrylate and 10 parts of ethyl acrylate (corresponding to component (II) of polymer (B)) was added to the reaction mixture over a period of 45 minutes. After completion of the addition of monomeric mixture, the reaction mixture was maintained at 60° C. for 1 hour and 30 minutes, and then cooled.

The conversion to polymer was 99.3%. The resulting latex was salted out with sodium chloride to coagulate it, filtered washed with water and then dried to obtain 98 parts of a polymer sample (1) corresponding to a two stage polymerization product (B). The polymer sample (1) had a specific viscosity of 1.65 measured at 30° C. in a benzene solution of a polymer concentration of 0.4 g/100 cc.

Comparative polymer samples (2) to (4) were obtained by conducting similar polymerization procedures. In polymer sample (2) only 88.24 parts of methyl methacrylate and 11.76 parts of n-butyl methacrylate corresponding to component (I) of polymer sample (1) were copolymerized. In polymer sample (3), only 33.33 parts of methyl methacrylate and 66.67 parts of ethyl acrylate corresponding to component (II) of polymer sample (1) were copolymerized. In polymer sample (4), all the monomers constituting polymer sample (1) were collectively subjected to random polymerization according to ordinary polymerization method.

TABLE 5

| | | | | Examples of Invention | Comparative Examples | | | |
|---|---|---|---|---|---|---|---|---|
| | | | | Emulsion polymerization of monomers (I) and subsequent emulsion polymerization of monomers (II) in same system | Only monomers (I) are polymerized | only monomers (II) are polymerized | random copolymer obtained by polymerizing (I) and (II) | Free of polymer (B) |
| | | Process of Preparation of Polymer (B) | | | | | | |
| | | Sample Number | | (1) | (2) | (3) | (4) | |
| Sub-components of Component (B) | Monomers constituting polymer (B) (I + II) (amounts) | Monomers constituting ingredient (I) | Methyl methacrylate (a) | 75 | 88.24 | 0 | (80) | |
| | | | n-Butyl methacrylate (b) | 10 | 11.76 | 0 | (10) | |
| | | Monomers constituting ingredient (II) | methyl methacrylate (a') | 5 | 0 | 33.33 | | |
| | | | ethyl acrylate (b') | 10 | 0 | 66.67 | (10) | |
| | Ratio (%) of component (I) in polymer (B) | | | 85 | 100 | 0 | — | — |
| | Ratio ($) of "a'" in component (II) | | | 33.33 | — | 33.33 | — | — |
| Properties of end composition | Workability | Presence of ungelled portions | | not observed | considerably observed | not observed | considerably observed | not observed |
| | | Time for gelation (minutes) | | 0.5 | 1.3 | 0.8 | 1.0 | 4.0 |
| | | Degree of gelation | | 1 | 1 | 3 | 1 | 4 |
| | Transparency | Percent transmission of total rays (%) | | 80.0 | 81.5 | 2.8 | 79.0 | 73.0 |
| | | Haze value (%) | | 2.6 | 2.8 | note 1 | 2.6 | 4.5 |
| | | Percent transmission of single wavelength | | | | | | |
| | | T400 (%) | | 55.0 | 57.5 | 0 | 53.2 | 43.5 |
| | | T600 (%) | | 78.0 | 80.0 | 0 | 76.6 | 68.0 |

Note 1: Haze value cannot be measured owing to white turbidity on the transparent plate.

Each polymer sample in an amount of 5 parts was blended with 100 parts of a polyvinyl chloride (having an average polymerization degree of 600), 1.5 parts of an octyl tin mercaptide stabilizer, 1.5 parts of soybean oil epoxide, 1 part of butyl stearate and 0.5 part of a polyglycol ester of a fatty acid, and the resulting composition was subjected to the following tests. The results are shown in the above Table 5.

Workability was measured by subjecting 55.0 g of the sample to processing test at a mixer temperature of 160° C., by employing a Brabender plastograph tester. The time for gelation represents the time (in minutes) from the initiation of processing to a point at which the blending resistance is highest. Since the time for gelation is shorter, processing can be conducted more easily and gelation is allowed to advance more rapidly. Thus, a shorter time for gelation indicates a better gelation acceleration property. The presence of ungelled portions (called "fish eyes") was determined by naked eye observation of a sheet formed by blending the sample for 10 minutes after the maximum resistance was attained, taking out the thus processed sample, and rolling it to a thickness of less than 0.3 mm.

The term "not observed" means a sample sheet where no fish eyes were present. The term "hardly observed" means a sample sheet where fish eyes are hardly present. The term "observed" means a sample sheet where fish eyes are present and scattered so that its practical use involves problems. The term "considerably observed" means a sample sheet where the presence of fish eyes is conspicuous. The degree of gelation was determined by the naked eye observation of transparency of the blended sample. When gelation was not advanced sufficiently, the vinyl chloride resin contains voids in its interior. Hence, such composition fails to show a sufficient transparency. A smaller value indicates a higher degree of gelation. The above discussed blending, measuring and evaluation methods adopted for determination of workability will apply to samples obtained in the subsequent examples.

The transparency was evaluated using a plate of 3 mm thickness formed by kneading the composition for 5 minutes with a roll maintained at 150° C. and pressing it at 160° C. for 15 minutes. The percent transmission of total rays and the haze value were determined according to JIS K-6714. A higher value of percent transmission of total rays indicates a better transparency, and a smaller haze value means a better transparency. The percent transmission of single wavelength was determined by means of a spectrophotometer with respect to visible rays of 400 mμ and 600 mμ, and the values are indicated as T400 and T600, respectively.

In particular, in admixtures of a methacrylic acid ester resin and a vinyl chloride resin, a bluish turbidity was frequently caused to appear. The degree of such turbidity can be measured by the T400 values. The measured value of T600 indicates an inclination similar to the value of percent transmission of total rays. From this value, the transparency can be evaluated. With respect to either T400 or T600, a greater value means better transparency. The above discussed blending, test piece-preparation, measuring and evaluating methods will apply to samples obtained in the subsequent examples.

From the results shown in Table 5, it can be concluded that polymer sample (1) of this example is superior to comparative polymer sample (2) in respect to the presence of ungelled portions and time for gelation.

Polymer sample (1), namely this invention is superior to comparative polymer sample (3) with respect to time of gelation, and degree of gelation, and is superior in transparency. Polymer sample (1) is superior in presence of ungelled portions, time for gelation, and transparency when compared to comparative random copolymer sample (4). When polymer sample (1) is compared with a composition free of any polymer (B), it is better in workability and transparency. Thus, the polyvinyl chloride composition comprising polymer sample (1) of this invention gives a processed product which is well gelled, in a short time for gelation, with an advanced degree of gelation and without any ungelled portions, and has excellent transparency showing a low haze value and low turbidity in T400.

EXAMPLE 7

The following were prepared and tested in the same manner as in Example 6, in order to examine what differences were brought about by the different methods of preparing polymer (B).

Sample (J). Data of polymer sample (1) obtained in Example 6, were adopted. It is construed that the sample has a partially grafted or blocked structure (two-staged polymerization product).

Sample (K). Lattices of polymer samples (2) and (3), each having an average particle size of about 1000 Å, were blended at a ratio of 85:15 so as to attain the same composition ratio as in polymer sample (1). The resulting latex mixture was coprecipitated with sodium chloride, washed with water and dried. (The foregoing produced polymeric mixture which was blended in the latex state.)

Comparative sample (L). Lattices of sample polymers (2) and (3) were separately coagulated, washed with water and dried to obtain fine powders, having a size distribution similar to polyvinyl chloride. Then, the powders were blended at a ratio of 85:15 so as to attain the same composition ratio as in sample polymer (1) (powdery blend).

Comparative sample (M). A sample was prepared by employing the same monomer composition as in polymer sample (1) but in reverse order of emulsion polymerization of monomeric mixtures (I) and (II). More specifically, monomers constituting component (II) of polymer sample (1) were at first subjected to emulsion polymerization, and then in the presence of resulting polymer latex monomers constituting component (I), were polymerized. The resulting polymer was coagulated, washed with water and dried to obtain a sample (contrary two-stage polymerization product).

Because of the influence of particle size on occurence of ungelled portions, in each of samples (J) (K) (L) (M), the particle size distribution was so adjusted that it was almost the same as the size distribution of the polyvinyl chloride used.

The results are shown in Table 6, hereinbelow.

From the results shown in Table 6, it is seen that polymer (B) prepared in accordance with the invention, gives an excellent composition as compared wtih comparative polymer samples as to ungelled portions not being observed and time for gelation being short. The gelation accelerating effect was high.

Among the foregoing samples, that prepared by method (J) was most prefered when all the items were taken into consideration.

EXAMPLE 8

Procedures of Example 6 were repeated with changed kinds and amounts of monomers of components (I) and (II) of two stage polymerization product (B), as shown in Table 7 below, and with changed ratio of monomers of component (I) in polymer (B). The resulting polymer samples were tested in the same manner as in Example 6. The results are shown in Table 7, hereinbelow. The results of polymer samples (1), (2), and (3) obtained in Example 6, are also shown in Table 7.

From the results shown in Table 6, hereinbelow, it is seen that it is preferred that polymer (B) consist of 50 to 99 parts of component (I) and 50 to 1 part of component (II), because a high transparency can be attained thusly in the resulting composition.

TABLE 6

| | | | | Example of This Invention | | Comparative Examples | |
|---|---|---|---|---|---|---|---|
| | | Sample Number | | (J) | (K) | (L) | (M) |
| | | | | emulsion polymerization of monomers of (I) and subsequent polymerization of monomers of (II) in same system (two stage polymerization product) | monomers of (I and II) are emulsion polymerized separately and resulting polymers are mixed in latex state (polymer mixture) | (monomers of (I) and (II) are emulsion polymerized separately, resulting polymers are treated separately, and mixed in powdery state (powdery mixture) | monomers of (II) are emulsion polymerized and monomers of (I) are polymerized in same system (contrary two stage polymerization product) |
| Subcomponents of polymer (B) | Monomers constituting polymer (B) (amounts) | Monomers constituting component (I) | methyl methacrylate (a) | 75 | 75 | 75 | 75 |
| | | | n-butyl methacrylate (b) | 10 | 10 | 10 | 10 |
| | | Monomers constituting component (II) | methyl methacrylate (a') | 5 | 5 | 5 | 5 |
| | | | ethyl acrylate (b') | 10 | 10 | 10 | 10 |
| Properties | Ratio of component (I) in polymer | | | 85 | 85 | 85 | 85 |

TABLE 6-continued

|  |  |  | Example of This Invention | | Comparative Examples | |
|---|---|---|---|---|---|---|
| | Sample Number | | (J) | (K) | (L) | (M) |
| | | | emulsion polymerization of monomers of (I) and subsequent polymerization of monomers of (II) in same system (two stage polymerization product) | monomers of (I and II) are emulsion polymerized separately and resulting polymers are mixed in latex state (polymer mixture) | (monomers of (I) and (II) are emulsion polymerized separately, resulting polymers are treated separately, and mixed in powdery state (powdery mixture) | monomers of (II) are emulsion polymerized and monomers of (I) are polymerized in same system (contrary two stage polymerization product) |
| of resulting composition | (B) (%) Workability | Ratio of (a') in component (II) (%) | 33.33 | 33.33 | 33.33 | 33.33 |
| | | Presence of ungelled portions | not observed | not observed | considerably observe | considerably observed |
| | | Time for gelation (minutes) | 0.5 | 0.6 | 2.0 | 1.6 |
| | | Degree of gelation | 1 | 1 | 1 | 1 |
| | Transparency | Percent transmission of total rays (%) | 80.0 | 79.8 | 76.8 | 77.0 |
| | | Haze value (%) | 2.6 | 2.8 | 3.5 | 3.0 |
| | | Percentage transmission of single wavelength | | | | |
| | | T400 (%) | 55.0 | 53.4 | 50.0 | 50.3 |
| | | T600 (%) | 78.0 | 77.0 | 74.2 | 74.6 |

TABLE 7

| | | | | Sample of This Invention | | | | | Comparative sample | | | |
|---|---|---|---|---|---|---|---|---|---|---|---|---|
| | | Sample No. | | (5) | (6) | (1) | (7) | (8) | (2) | (9) | (10) | (3) |
| Constituents of polymer (B) | monomers constituting polymer (5) | Monomers constituting component (I) | methyl methacrylate (a) | 90 | 80 | 75 | 75 | 60 | 88.24 | 37.5 | 18.5 | |
| | | | ethyl methacrylate (b) | 5 | 10 | | | 10 | | | | |
| | | | n-butyl methacrylate (b) | | | 10 | | | 11.76 | 2.5 | 1.5 | |
| | | | ethyl acrylate (b) | | | | 10 | | | | | |
| | amounts | monomers constituting components (II) | methyl methacrylate (a') | 1 | 4 | 5 | 5 | 10 | | 20 | 26.67 | 33.33 |
| | | | n-butyl methacrylate (b') | | | | 10 | 10 | | | | |
| | | | ethyl acrylate (b') | 4 | 6 | 10 | | 10 | | 40 | 58.33 | 66.67 |
| | Ratio (%) of component (I) in Polymer (B) | | | 95 | 90 | 85 | 85 | 70 | 100 | 40 | 20 | 0 |
| | Ratio (%) of (a') in component (II) | | | 20 | 40 | 33.33 | 33.33 | 33.33 | — | 33.33 | 33.33 | 33.33 |
| Properties of composition | Workability | Presence of ungelled portions | | hardly observed | not observed | not observed | not observed | not ob served | considerably observed | not observed | not observed | not observed |
| | | Time for gelation (minutes) | | 1.0 | 0.7 | 0.5 | 0.4 | 0.4 | 1.3 | 0.6 | 0.7 | 0.8 |
| | | Degree of gelation | | 1 | 1 | 1 | 1 | 1 | 1 | 2 | 2 | 3 |
| | Transparency | Percent of transmission of total rays (%) | | 77.8 | 79.0 | 80.0 | 79.6 | 78.3 | 81.5 | 48.5 | 5.7 | 2.8 |
| | | Haze value (%) | | 2.5 | 2.6 | 2.6 | 2.6 | 2.7 | 2.8 | note (1) | note (1) | note (1) |
| | | Percent of transmission of single wavelength | | | | | | | | | | |
| | | T400 (%) | | 53.0 | 55.0 | 55.0 | 55.0 | 54.2 | 57.5 | 12.0 | 0 | 0 |
| | | T600 (%) | | 76.0 | 78.0 | 78.0 | 77.7 | 76.4 | 80.0 | 45.0 | 0.5 | 0 |

Note (1): Haze value cannot be measured due to white turbidity on transparent plate It can all be seen from a study of Table 7, hereinabove, that the acrylic acid ester or methacylic acid ester, exclusive of methyl methacrylate, denoted as component (b) in component (I) and that component (b') in Component (II) are interchangeable within the range specified in the invention.

EXAMPLE 9

The procedure of Example 6, were repeated with changed amounts of monomers of components (I) and (II) in the two stage polymerization product (B) as indicated in Table 8, hereinbelow, so as to examine the influence of the monomers of component (II) in polymer (B). More specifically, the ratio of methyl methacrylate (a') and acrylic acid ester or methacrylic acid ester, exclusive of methyl methacrylate, (b') in component (II) was varied. Incorporation of other monomers (c) and (c') copolymerizable with monomers (a) and (b) and monomers (a') and (b') was also examined. Thus, there was obtained polymer samples (11) to (20).

These samples were tested in the same manner as in Example b 6. The results of such tests are shown in Table 8, hereinbelow.

Comparative polymer samples (17) and (18) were inferior in gelation-accelerating effect because of a larger quantity of methyl methacrylate (a') in component (II). Thus, ungelled portions were observed in these samples. The comparative sample (19) was inferior in transparency owing to a smaller content of methyl methacrylate (a) in component (I). In comparative polymer sample (20), the degree of gelation was poor because of the absence of methyl methacrylate (a') in component (II).

Also the transparency was inferior. On the other hand, polymer samples of this invention did not bring about such disadvantages. It can be seen from the data of polymer samples (11) to (14), in Table 8, hereinbelow, good workability and high transparency can be maintained even if the kind of acrylic acid ester or methacrylic acid ester, exclusive of methyl methacrylate, is varied. Furthermore, even in the case of polymer samples (15) and (16) formed by employing other copolymerizable monomers, the resulting compositions possessed apparently characteristic features and advantages intended by this invention.

TABLE 8

| | | | Sample of This Invention | | | | | | Comparative sample | | | |
|---|---|---|---|---|---|---|---|---|---|---|---|---|
| | Sample Number | | (11) | (12) | (13) | (14) | (15) | (16) | (17) | (18) | (19) | (20) |
| Constituents of polymer (B) | Monomers constituting polymers (B) (amounts) | Monomers constituting component (I) | | | | | | | | | | |
| | | methyl methacrylate (a) | 75 | 75 | 75 | 75 | 75 | 73 | 75 | 75 | 30 | 75 |
| | | n-butyl methacrylate (b) | 5 | 10 | | 5 | 5 | 5 | 5 | 5 | 50 | 5 |
| | | ethyl acrylate (b) | | | 10 | | | | | | | |
| | | acrylonitrile (c) | | | | | | 2 | | | | |
| | Monomers constituting component (II) | methyl methacrylate (a') | 7 | 5 | 5 | 5 | 5 | 7 | 20 | 15 | 7 | |
| | | n-butyl methacrylate (b') | | | | 15 | | | | | | |
| | | ethyl acrylate (b') | 13 | | 10 | | 13 | 18 | | 5 | 13 | 20 |
| | | n-butyl acrylate (b') | | 10 | | | | | | | | |
| | | acrylonitrile (c') | | | | | | 2 | | | | |
| Properties of end composition | Ratio (%) of component (I) in polymer (B) | | 80 | 85 | 85 | 80 | 80 | 80 | 80 | 80 | 80 | 80 |
| | Ratio (%) of (a') in component (II) | | 35 | 33.33 | 33.33 | 25 | 20 | 35 | 100 | 75 | 75 | 0 |
| | Workability | Presence of ungelled portions | not observed | not observed | not observed | not observed | not observed | not observed | considerably observed | not observed | not observed | not observed |
| | | Time for gelation (minutes) | 0.6 | 0.4 | 0.5 | 0.5 | 0.6 | 0.5 | 2.3 | 1.3 | 0.3 | 0.8 |
| | | Degree of gelation | 1 | 1 | 1 | 1 | 1 | 1 | 2 | 2 | 1 | 2 |
| | Transparency | Percent transmission of total rays (%) | 79.2 | 78.9 | 78.3 | 81.5 | 78.2 | 77.6 | 80.0 | 78.1 | 62.7 | 71.9 |
| | | Percent transmission of single wavelength | | | | | | | | | | |
| | | T400 (%) | 54.2 | 58.5 | 51.6 | 55.4 | 58.9 | 51.9 | 50.3 | 52.0 | 28.5 | 42.3 |
| | | T600 (%) | 77.8 | 78.4 | 76.1 | 79.7 | 77.0 | 77.0 | 77.9 | 76.2 | 58.0 | 70.8 |
| | | Haze Value (%) | 2.4 | 2.7 | 2.9 | 2.4 | 2.6 | 2.8 | 3.1 | 2.7 | 7.4 | 4.1 |

EXAMPLE 10

Polymer sample (1) was prepared in the same manner as in Example 6. The following workabiliy tests were conducted. As a comparative sample, compositions free of polymer sample (1) were also tested.

(a) 10 parts of polymer sample (1) were incorporated into a mixture consisting of 100 parts of a polyvinyl chloride (having an average degree of polymerization of 1040), 3 parts of a tin mercaptide stabilizer and 1 part of butyl stearate. The mixture was kneaded at 140° C. by means of a roll. The mixture was readily wound around the kneading roll. There was obtained a transparent sheet. The resulting sheet was not broken or cracked under bending.

The comparative composition free of polymer sample (1) required a considerable time for winding around the kneading roll at a processing temperature of 140° C. The sheet obtained by conducting the kneading at 140° C. was always broken, under bending, because of an insufficient degree of gelation. In order to obtain a sheet having a sufficient strength from the comparative composition, it was necessary to conduct the roll kneading at 155° C.

Also, when a polyvinyl chloride (having an average degree of polymerization of 2500) was used, there was a difference of temperature of about 15° C. for obtaining a sheet having sufficient strength between the composition containing polymer sample (1) and the comparative composition free of polymer sample (1). Thus, in the composition containing polymer sample (1), the processing temperature could be lowered.

(b) 10 parts of polymer sample (1) was incorporated into a mixture having the same composition as in paragraph (a) above except that a polyvinyl chloride (having an average degree of polymerization of 760) was used. The resulting mixture was kneaded at 155° C. for 5 minutes by means of a roll to obtain a sheet of 0.5 mm thickness. The sheet was heated to 160° C. and subjected to vacuum molding. In this molding, deep drawing was obtained.

In the comparative composition free of polymer sample (1), occurence of breakage was extreme in vacuum molding. Thus, molding was impossible to accomplish. These sheets were pressed at 165° C. and dumbbell test pieces of JIS 2 were prepared therefrom by a cutting process. With respect to these test pieces, the elongation at breakage was measured at 140° C. at a pulling rate of 100 mm/min. The composition containing polymer sample (1) showed a 200% elongation. The comparative composition free of the polymer sample (1) showed only a 65% elongation.

(c) 2 parts of polymer sample (1) were incorporated in a mixture consisting of 87 parts of a polyvinyl chloride (having an average degree of polymerization of 660), 13 parts of an impact resistance enforcing agent (methyl methacrylate-butadiene-styrene copolymer resin: KANE ACE B-12 manufactured by Kanegafuchi Chemical Industry Co., Ltd) (KANE ACE is a registered trademark of Kanegafuchi Chemical Industry Co., Ltd) 1.5 parts of an octyl tin mercaptide stabilizer, 1.5 parts of soybean oil epoxide, 1 part of butyl stearate and 0.5 part of a fatty acid polyglycol ester. The resulting composition was subjected to a blow molding test. In the composition containing polymer sample (1), even after blow molding operation had been continued for 5 hours, there was no change observed in appearance in blow molded bottles which were free of ungelled portions, and had a lustrous surface.

In contrast, in about 1 hour after initiation of blow molding, bottles made from compositions having no polymer sample (1) had no luster or brightness on their surfaces. This fact means that the resin composition of this invention containing polymer sample (1) enables blow molding stably for a long period of time.

(d) 5 parts of polymer sample (1) were incorporated into a mixture consisting of 100 parts of a vinyl chloride-vinyl acetate copolymer resin having a vinyl acetate content of 80% (having an average degree of polymerization of 800), 3 parts of a tin mercaptide stabilizer and 1 part of butyl stearate. When the resulting composition was subjected to a Brabender plastograph test, it was found that the time for gelation was 0.1 minute. The product obtained by kneading the composition was well gelled and free of ungelled portions. In the comparative composition free of polymer sample (1), the time for gelation was as long as 1.0 minute, and in the kneaded product the degree of gelation was insufficient.

(e) 3 parts of polymer sample (1) were incorporated into a mixture consisting of 100 parts of a post chlorinated polyvinyl chloride having a chlorine content of 66% (having an average degree of polymerization of 800), 3 parts of a lead stabilizer and 3 parts of a metal soap. The composition was molded into hollow pipes by employing an extruder of a diameter 65 mm (L/D=22; C.R.=3.5). Thus, there was obtained pipes having a good surface condition and a sufficient degree of gelation.

From the comparative composition without polymer sample (1), there was obtained pipes having no brightness on the surface with opaque portions and a great number of convexities and concavities. Thus, it is evident that in the composition of this invention, even if an after chlorinated polyvinyl chloride is used as the polyvinyl chloride component, an excellent gel effect is attained and a sufficient degree of gelation is obtained.

The foregoing description is intended for only illustrative purposes. Numerous variations and modifications thereof would be apparent to the worker skilled in the art. All such modifications and variations are to be considered to be within the spirit and scope of the invention.

What is claimed is:

1. Vinyl chloride resin composition having improved physical properties and improved workability, comprising (A) 100 parts by weight of vinyl chloride series resin selected from the group consisting of polyvinyl chloride, copolymer of at least 80% by weight vinyl chloride with other monomers copolymerizable therewith, and after chlorinated polyvinyl chloride; and blended therewith (B) 0.1 to 100 parts by weight of a composite interpolymer having a specific viscosity of at least 0.1, obtained by emulsion polymerizing in an aqueous medium consisting essentially of an emulsifier and a polymerization initiator, 70 to 95 parts by weight of a first member selected fromm the group consisting of methyl methacrylate and a first monomer mixture consisting of 85.71 weight percent or more of methyl methacrylate and 14.29 weight percent or less of a second member selected from the group consisting of n-butyl methacrylate, ethyl methacrylate, ethyl acrylate, acrylonitrile and mixtures thereof; and then, emulsion polymerizing by adding to said aqueous medium containing the polymerization product of the prior polymerization step, 5 to 30 parts by weight of a second monomer mixture consisting essentially of 20 to 40 weight percent methyl methacrylate and 80 to 60 weight percent of a third member selected from the group consisting of ethyl acrylate, n-butyl methacrylate, acrylonitrile, ethyl methacrylate, n-butyl acrylate, and mixtures thereof.

2. Composition of claim 1, wherein said monoolefinic other monomers copolymerizable to form said rigid thermoplastic phase and said elastomer phase is selected from the group consisting of acrylonitrile, methacrylonitrile, vinyl acetate, vinyl propionate and mixtures thereof.

3. Composition of claim 1, wherein said specific viscosity is at least 0.5.

4. Composition of claim 1, wherein said composite interpolymer is milled with said vinyl chloride series resin.

5. Vinyl chloride resin composition having improved physical properties and improved workability, comprising (A) 100 parts by weight of vinyl chloride series resin selected from the group consisting of polyvinyl chloride, copolymer of at least 80% by weight vinyl chloride with other monomers copolymerizable therewith, and after chlorinated polyvinyl chloride; and blended therewith (B) 0.1 to 100 parts by weight of a composite interpolymer having a specific viscosity of at least 0.1 obtained by emulsion polymerizing in an aqueous medium consisting essentially of an emulsifier and a polymerization initiator, 70 to 95 parts by weight of a first member selected from the group consisting of methyl methacrylate and a first monomer mixture consisting of 85.71 weight percent or more of methyl methacrylate and 14.29 weight percent or less of a second member selected from the group consisting of acrylic acid esters, methacrylic acid esters, and mixtures thereof excluding methyl methacrylate, and 0 to 20 weight percent monoolefinic other monomers copolymerizable with the foregoing monomers; and then, emulsion polymerizing by adding to said aqueous medium containing the polymerization product of the prior polymerization step, 5 to 30 parts by weight of a second monomer consisting essentially of 20 to 40 weight percent methyl methacrylate and 80 to 60 weight percent of a third member selected from the group consisting of acrylic acid esters, methacrylic acid esters and mixtures thereof, excluding acrylonitrile and methyl methacrylate, and 0 to 20 weight percent monoolefinic other monomers copolymerizable with the foregoing monomers.

* * * * *